United States Patent [19]

Lloyd, Sr. et al.

[11] Patent Number: 4,750,832
[45] Date of Patent: Jun. 14, 1988

[54] VIDEO PROJECTOR MOUNT

[75] Inventors: Kenneth A. Lloyd, Sr.; Earl M. McDaniel, both of Indianapolis; Franklin D. Smock, Plainfield, all of Ind.

[73] Assignee: McDaniel & Lloyd, Inc., Indianapolis, Ind.

[21] Appl. No.: 21,720

[22] Filed: Mar. 4, 1987

Related U.S. Application Data

[63] Continuation of Ser. No. 795,329, Nov. 6, 1985, abandoned.

[51] Int. Cl.$^4$ .................. G03B 17/00; G03B 21/00
[52] U.S. Cl. .................. 352/243; 352/104; 352/242; 248/183
[58] Field of Search ............ 352/34, 104, 243, 242, 352/131, 132, 87; 354/293; 248/183, 327, 342, 343

[56] References Cited

U.S. PATENT DOCUMENTS

| 3,457,006 | 7/1969 | Brown et al. | 352/132 |
| 4,093,364 | 6/1978 | Miller | 352/132 |
| 4,160,999 | 7/1979 | Claggett | 352/243 |
| 4,577,827 | 3/1986 | Eliscu | 248/183 |

FOREIGN PATENT DOCUMENTS 1216812 11/1961 France .................. 352/131

OTHER PUBLICATIONS

Schedule of Class 474, p. 2.
Sony, *Universal Video Projector* VPH-1020QM/722QM, VPH-1020QM/722Q Sales Manual, Revised Dec. 1983.

Primary Examiner—Monroe H. Hayes
Attorney, Agent, or Firm—Woodard, Emhardt, Naughton, Moriarty & McNett

[57] ABSTRACT

A projector mounting frame is fitted in the space above the suspended ceiling of a room. A traveling frame vertically movable in the mounting frame has means for support of a projector thereon. Drive motor and screws drive the traveling frame vertically so the projector can be driven from a position concealed within the space above the ceiling to a position below the ceiling where it can project onto a wall or screen in the room. A trim frame is hung on the traveling frame under the projector and has ceiling pads or tiles on it matching the rest of the ceiling to neatly close the ceiling opening when the projector is concealed.

20 Claims, 3 Drawing Sheets 4,750,832

VIDEO PROJECTOR MOUNT

This application is a continuation of application Ser. No. 795,329, filed Nov. 6, 1985, now abandoned.

BACKGROUND OF THE INVENTION

This invention relates generally to means for mounting a video projector so it can project onto a screen or the like, and more particularly to a mounting which normally conceals the projector above a ceiling, but can lower the projector into position for operation.

Various types of projectors are known. Perhaps the most common is a motion picture projector. More recently, so-called "video projectors" have been introduced for projecting light onto a screen to produce pictures derived from electrical signals obtained from wireless signal receivers or from some storage medium such as a disc or a tape. One such projector is generally described in a sales manual number MK0579MP8401P1-002 by the Sony Corporation entitled *Universal Video Projector*, Dec. 1983 revision. A copy of that manual is to be enclosed with this patent application and the contents thereof incorporated herein by reference.

One way to mount the projector is shown on the front page of the manual where it is on a movable cart between two tables in a conference room and is projecting onto a screen. On page 21 of that manual, there are four schematic diagrams, one showing a ceiling mount used with a flat screen, one showing a ceiling mount used with a concave aluminum screen, one showing a desk top use, and one showing floor use. On page 12, in the lower right-hand block of pictures, is shown a type of hanger or post by which such a projector is hung from a ceiling. The post mounting of a video projector has some disadvantages. Where the ceiling is low, it cannot be used effectively because the projector reduces headroom, and can be an undesirable obstruction when it is not in use, and when it is in use too. In any case, it is exposed to dust and possible theft. Moreover, some might regard it as unsightly. The present invention is directed to overcoming such disadvantages of the ceiling mounts heretofore known for video projectors.

SUMMARY OF THE INVENTION

According to a typical embodiment of the present invention, a projector mounting assembly is fitted in the space between the suspended ceiling of a room, and the overhead support structure. The mounting assembly includes a mounting frame attached to the support structure, and a traveling frame vertically movable in the mounting frame. Means are provided on the traveling frame for support of a projector thereon. Vertical drive means are provided to drive the traveling frame vertically in the mounting frame so the projector can be moved from a stored position concealed within the space above the ceiling to an operating position below the ceiling where it can project onto a wall or screen in the room. A closure means is provided under the projector, suspended from the traveling frame, to close the ceiling opening when the projector is concealed. The closure may be plain or may have finishing materials on it selected to match or blend with the materials in the rest of the ceiling.

DESCRIPTION OF THE PREFERRED EMBODIMENT

Figure 1:
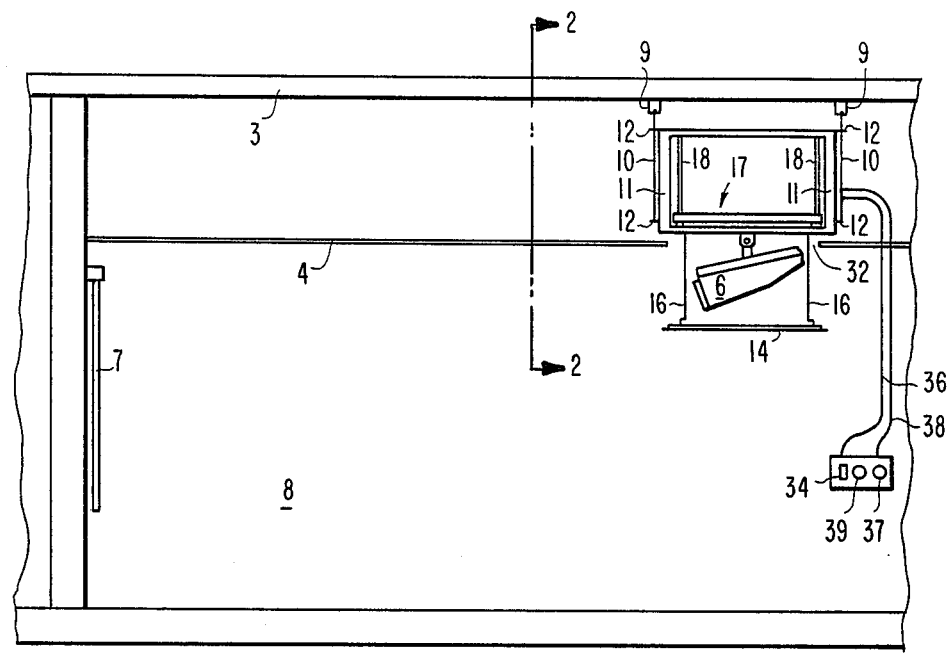
FIG. 1 is a diagram of a building room with a projector mount installed according to a typical embodiment of the present invention, and the projector mount fully extended.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings, FIG. 1 shows a room in a building with the projector mount assembly 1 shown in place, mounted in the space 2 between the ceiling support structure 3 of the building, and the suspended ceiling 4. The projector 6 is in position for projecting onto the vertical wall or screen 7 at the end of the room 8 below the ceiling. The side cover plates of the projector mount assembly are removed to show the interior details.

Figure 2:
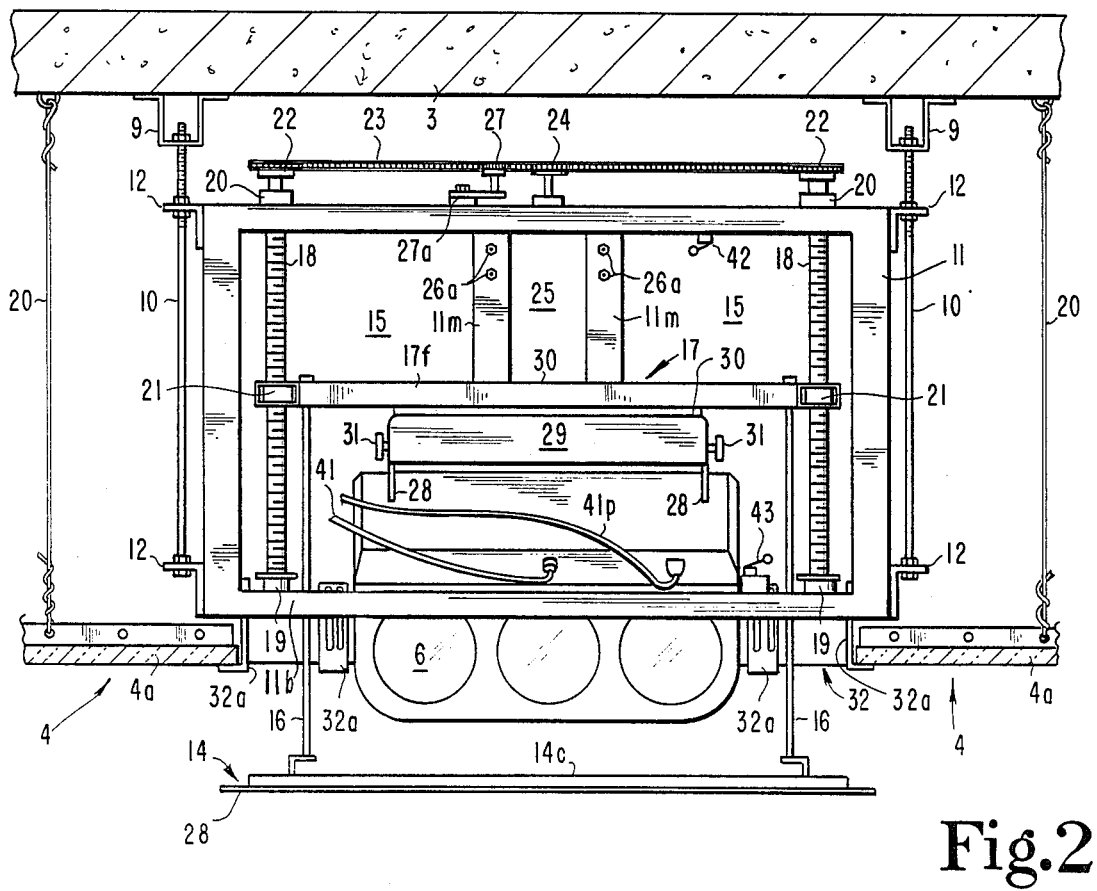
FIG. 2 is an enlarged fragmentary section through the ceiling assembly of the room at line 2—2 in FIG. 1 but with the projector mount partially extended.

Referring to FIG. 2, the overhead building structure 3 is shown with a ceiling 4 suspended from it in conventional manner by hanger wires 20. An opening 32 is framed by conventional lay-in ceiling panels 4a on the grid members hanger wires. The illustrated embodiment of the present invention includes two frames made primarily of lengths of steel tubing of rectangular cross section welded together. The first frame is a mounting frame 11 which is rectangular in each of its three dimensions. It has stub angle sections welded on the corner posts providing tabs 12 by which it can be secured to the ceiling support structure 3. Sturdy hanger means secured to the building structure 3 can be used for this purpose. In the illustrated embodiment (FIG. 1), brackets 9 are affixed to the structure 3. Threaded rods 10 are secured to the brackets 9, and pass through vertically aligned apertures in the mounting tabs 12, with nuts threaded on the rods above and below the tabs securing the frame to the rods.

Figure 4:
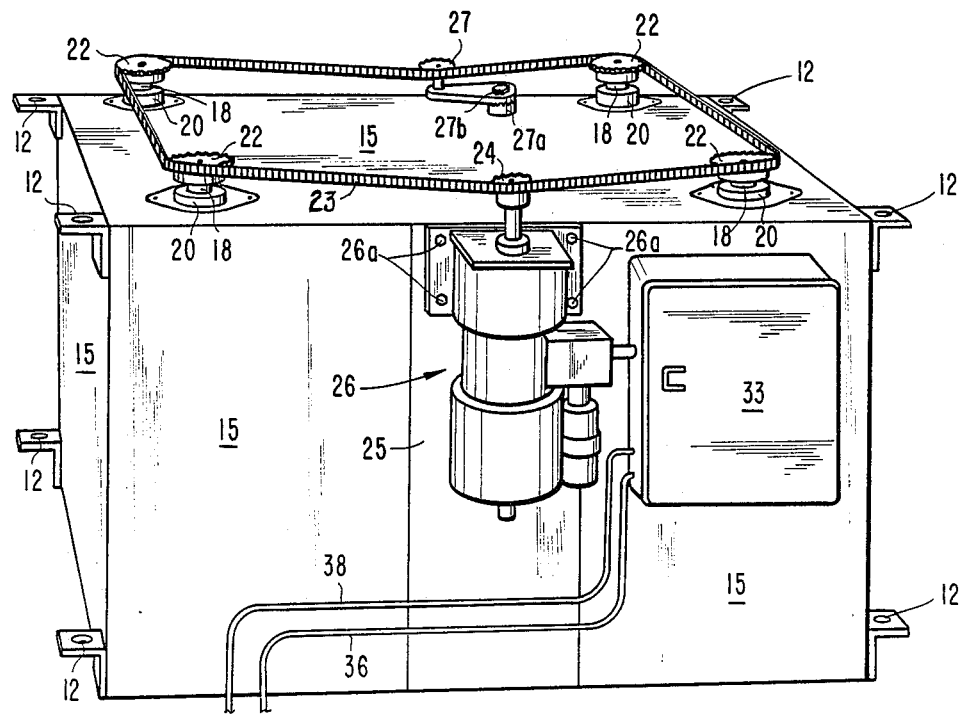
FIG. 4 is a pictorial view of the projector mount assembly as seen from the side with the drive motor and control box on it, and with the side and top cover plates installed.

The second frame is a traveling frame 17 located within the mounting frame 11. It is not seen in FIG. 4 because it is hidden behind the walls 15 typically made of metal plates screwed to the frame 11 and covering the frame 11 completely around and across the top of the frame 11. The traveling frame is rectangular in all of its three dimensions.

There are four drive shafts 18, one passing through the traveling frame near each corner. They are mounted in bearings 19 and 20 secured to the mounting frame 11. Each of the shafts 18 has a screw thread thereon. The traveling frame 17 has four nuts 21 threaded onto the shafts 18 and confined in the frame 17. Rotation of the nuts is prevented because they are received in the horizontal tubes of the frame, and the dimension across the corners of the nuts is greater than the distance between the vertical walls of the tubes in which the nuts are received. So the nuts can support the frame 17 but will not turn within the frame. Therefore, when the screws 18 are rotated, the traveling frame is driven up or down.

The screw shafts 18 are driven by sprockets 22 at their upper ends. A single roller chain 23 is driven by a sprocket 24 which is driven by an electric motor assembly 26 secured to the mounting frame 11. Chain 23 drives the sprockets 22 to drive the frame 17 up or down. The drive motor is hidden from view in FIG. 2 by cover plate 25 screwed to the far side of the motor mount posts 11m welded into the upper and lower rear crossmembers of frame 11. The motor assembly is mounted to these posts by bolts 26a with suitable grommets around them to minimize noise. An idler sprocket 27 is mounted to an arm which has a circularly serrated bottom surface engaged with a matching serrated disc 27a, both held to the frame by bolt 27b. This permits suitable tension adjustment by positioning the idler arm and then locking it tight to the frame by tightening the bolt 27b or a nut thereon.

The illustrated projector has a pair of horizontally-spaced brackets 28 extending up from its top. These are mounted to the downwardly projecting ears of a support bar 29 that is affixed to a plate 30 fastened to the bottom of a pair of intermediate crossmembers of the traveling frame and which are parallel to, coplanar with and hidden behind crossmember 17f. Therefore the projector is suspended from the traveling frame. If desired, the mounting of the bar 29 to the brackets 28 can be pivoting on a horizontal axis and adjustable by knobs 31 as on page 12 of the above mentioned literature.

Figure 2A:
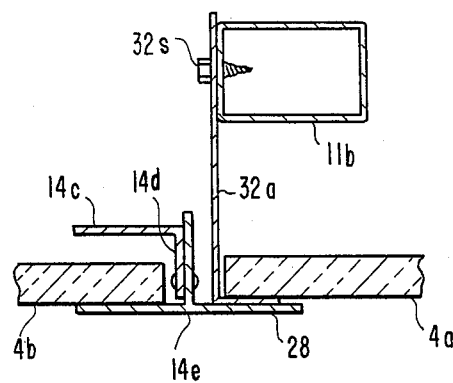
FIG. 2A is an enlarged fragmentary view of the ceiling trim detail.
Figure 3:
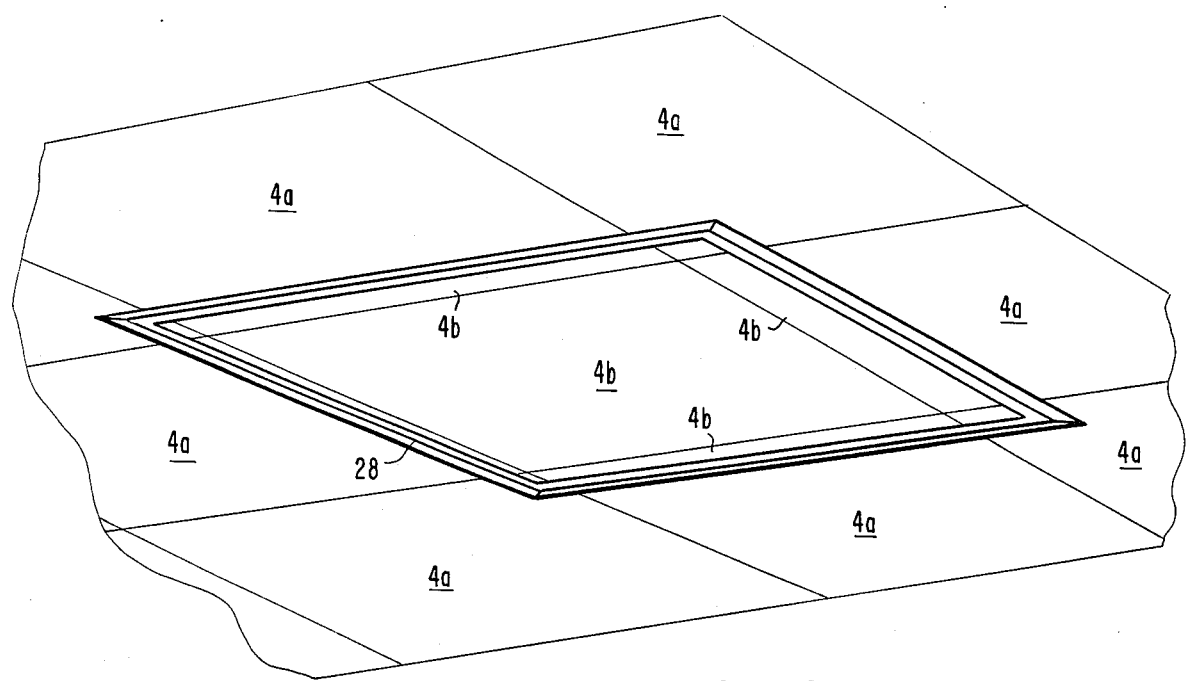
FIG. 3 is a view looking up at the ceiling, with the projector mount fully retracted.

A typical suspended ceiling includes lay-in panels 4a (FIG. 3) which may be approximately two feet by two feet or two feet by four feet in dimension, or "tiles" which may be one foot square. In either case, the present invention can be readily incorporated in such a ceiling. The panel edges at the opening 32 are supported by L-shaped hanger plates 32a fastened to the four bottom members 11b of frame 11. Each plate 32a has a pair of vertically extending slots receiving screws 32s through them and which are screwed into members 11b and tightened to hold the hangers at the right height. The panels 4a rest on the horizontal flanges of these hangers. In order to neatly close the hole in the ceilng when the unit is not in use, a trim frame 14 is suspended by four hanger rods 16 secured to the traveling frame 17. The trim frame may have an integrally formed, or fastened, recessed center panel 14c. Pads 4b or tiles are attached to the bottom of the center panel 14c or can rest on the inturned flange of tee 14e (FIG. 2A), and are of a configuration and surface finish to match those (4a) in the rest of the surface of the ceiling 4.

Figure 2B:
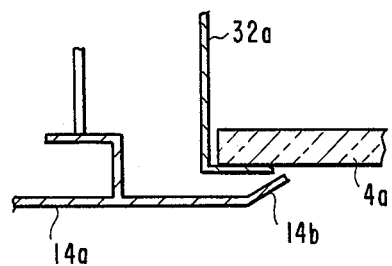
FIG. 2B is an enlarged fragmentary view of an alternative trim detail.

The outwardly extending flanges 28 of tees 14e cover the flanges of hangers 32a. So the trim frame assembly serves as a nice trim for the decorative tiles or panels on the bottom of the frame and for the opening 32 in the ceiling through which the projector descends. A simpler unit with just a pan 14a and upturned edge 14b is shown in FIG. 2B.

The electrical connections from the projector, both for power and signals, is provided through a utility box 33 (FIG. 4) on one of the rear cover plates 15 of the frame 11. This box may have suitable jacks or terminals or connectors therein or thereon for connection of power from the building supply or the room circuit supply and for drive motor control signals from a remote switch and for video signals from a television receiver or from a video cassette player or the like located in the room or elsewhere in the building. Control for the vertical drive motor may be provided by a three position wall switch 34 (FIG. 1) having a neutral open position and coupled through cable 36 to the utility box 33. The video signal delivery and power for the projector may be provided to the box 33 from the wall location by provision of jacks 37 and 39 and cable 38. The wall location may be used in this instance as a convenient connector or junction device for plugging a video player or television receiver into socket 37 or 39 for coupling the signal through the wall unit to the cable 38. For the above mentioned SONY projector, a VPR-722 remote control unit as indicated in the ceiling mounting diagram on page 14 of the above mentioned sales manual can be plugged into jacks 37. Infrared remote control might also be used. Additional sockets, plugs and cables can be provided as desired. Similarly, signal and power cables 41s and 41p, respectively, (FIG. 2) from the connector panel on the front of the projector, through back wall plate 15 into box 33 can be provided, as desired, the cables being long enough to accommodate the total vertical travel of the projector with respect to the wall. The upward and downward drive of the frame 17 is limited to the flush closed position of FIG. 3 and the full open position of FIG. 1 by limit switches 42 and 43 respectively. The details of control wiring are not shown herein as they are well within the skill in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A video projector mount comprising:
   a first frame fixedly mountable above a finished ceiling and defining a video projector storing space within said frame:
   a second frame vertically movable within said space between a top and a bottom position;
   a plurality of shafts supporting said second frame on said first frame and along which said second frame is vertically movable;
   ceiling finishing means for interfacing with said finished ceiling, said finishing means being attached to and suspended from said second frame and vertically movable therewith and being spaced sufficiently below said second frame for mounting a video projector to said second frame above said finishing means; and
   drive means causing said shafts to operate in unison to drive said second frame in a vertical direction between said top and bottom positions within said space, whereby a video projector mounted to said second frame is movable out of said space within said first frame to extend below said finished ceiling when said second frame is in said bottom position, and whereby the video projector is movable into said space and the ceiling finishing means interface with said finished ceiling when said second frame is in said top position.

2. The mount of claim 1 wherein:
said finishing means encompasses an area greater than the vertically projected area of said projector whereby said finishing means conceals the projector from observation from below when said second frame is driven to its said top position in said first frame.

3. The mount of claim 1 wherein:
said second frame includes a cross member on which said projector can be hung.

4. The mount of claim 1 wherein:
said ceiling finishing means include a trim frame and decorative ceiling panel means at the bottom of said trim frame.

5. The mount of claim 4 wherein:
said trim frame includes an outwardly turned flange for flush meeting with said ceiling.

6. The mount of claim 1, wherein said drive means comprises:
a drive motor mounted to said first frame and having an output shaft with a drive wheel thereon:
a drive belt;
a drive wheel on each of said shafts;
said drive belt engaging and driving said drive wheels in unison, and being drivable by the wheel on said output shaft;
screw threads on said shafts; and
nuts on said second frame and threaded on said shaft threads and held against rotation on said second frame whereby the driving of said belt by said drive motor rotate said shafts in unison and drives said second frame and finishing means in the vertical direction.

7. The mount of claim 6, wherein said drive means further comprises:
means for adjusting the amount of tension in said drive belt while the drive belt is engaging said drive wheels and said drive wheel on said output shaft.

8. The mount of claim 6 wherein:
said wheels are sprockets; and
said belt is a chain.

9. In a building structure having a room therein and having overhead support structure above the room and having a finished ceiling assembly spaced below the support structure to provide the visible ceiling for the room from below, the improvement comprising:
a mounting frame attached to said support structure and positioned above the visible ceiling;
a projector receiver;
vertical drive means mounted to said mounting frame;
a vertically traveling frame mounted on said drive means, said projector receiver being mounted to said traveling frame;
said vertical drive means being operable, when actuated, to drive said receiver vertically between an exposing position below the visible ceiling where a projector, when supported on said receiver, can project images onto a vertical viewing surface in the room, and a concealing position where said mounting frame and said traveling frame and the projector are all concealed in the space between said overhead support structure and the visible ceiling.

10. The improvement of claim 9 and further comprising:
a finished surface suspended from said traveling frame below said projector receiver that matches the visible ceiling's finished surface and that is movable vertically with said traveling frame to a position coplanar with said finished ceiling surface when said receiver is in said concealing position.

11. The improvement of claim 10 wherein:
said finished ceiling surface comprises a plurality of rectangular panels, and said matching finished surface comprises rectangular panels, with borders between panels of said finished ceiling surface being aligned with borders between panels of said matching finished surface when operation of said drive means has placed said matching finished surface coplanar with said finished ceiling surface when said reciever is in said concealing position.

12. The improvement of claim 10 wherein:
said traveling frame is within said mounting frame when said receiver is in said concealing position.

13. The improvement of claim 12 and further comprising:
a video projector mounted on said receiver above and spaced from said matching finished surface.

14. The improvement of claim 13 wherein:
said video projector is hung from said receiver.

15. The improvement of claim 9 wherein:
said drive means include a plurality of drive screws rotatably mounted in said mounting frame, and
a plurality of driven nuts received on said screws and held on said traveling frame against rotation thereon.

16. The improvement of claim 15 wherein:
there are four of said screws located proximate four corners of said frames,
said screws having sprockets thereon,
said drive means further comprising a drive motor, a drive sprocket coupled to and driven by said motor, and a drive belt received around said sprockets to drive said screws in unison.

17. The improvement of claim 16, wherein said drive means further comprises:
means for adjusting the amount of tension in said drive belt while the drive belt is engaging said sprockets.

18. A projector mounting assembly comprising:
attaching means for attachment to a building:
a projector receiver supporting a projector;
powered vertical drive means coupled to said attaching means and to said receiver and operable, when actuated, to drive said receiver with a projector on it vertically between a projector exposing position below a building ceiling where the projector, when supported on said receiver, can project images onto a vertical surface in a room under the ceiling, and a concealing position where the projector is concealed in a space above the ceiling; and
ceiling finishing means coupled to said drive means and located under said receiver and projector for blending with a surrounding ceiling surface and movable vertically with said receiver to be positionable coplanar with a surrounding ceiling surface when said receiver is in said concealing position.

19. The assembly of claim 18 and further comprising:
a traveling member mounted on said drive means,
said receiver being hung on and located below said traveling member, and said finishing means being hung on said traveling member.

20. The assembly of claim 19 wherein:
said drive means include drive screw and nut means, the screw means being associated with said attaching means, and the nut means being associated with said traveling member.

* * * * *